(12) United States Patent
Pusheck

(10) Patent No.: US 11,231,302 B2
(45) Date of Patent: Jan. 25, 2022

(54) BI-DIRECTIONAL SNAP FIT ELECTRONIC UNIT

(71) Applicant: VEONEER US, INC., Southfield, MI (US)

(72) Inventor: Jacob Pusheck, Waterford, MI (US)

(73) Assignee: VEONEER US, INC., Southfield, MI (US)

( * ) Notice: Subject to any disclaimer, the term of this patent is extended or adjusted under 35 U.S.C. 154(b) by 173 days.

(21) Appl. No.: 16/560,981

(22) Filed: Sep. 4, 2019

(65) Prior Publication Data
US 2021/0063211 A1 Mar. 4, 2021

(51) Int. Cl.
*G01D 11/30* (2006.01)
*G01D 11/24* (2006.01)

(52) U.S. Cl.
CPC .......... *G01D 11/245* (2013.01); *G01D 11/30* (2013.01)

(58) Field of Classification Search
CPC .............................. G01D 11/245; G01D 11/30
See application file for complete search history.

(56) References Cited

U.S. PATENT DOCUMENTS

| | | | |
|---|---|---|---|
| 5,945,606 A * | 8/1999 | Tokunaga ................ | G01K 1/14 73/756 |
| 9,360,348 B2 * | 6/2016 | Henzler ................ | G01L 19/143 |
| 9,470,595 B2 * | 10/2016 | Ramsay ............... | G01L 19/0069 |
| 10,161,769 B2 * | 12/2018 | Woernle ............... | G01D 11/245 |
| 10,203,228 B2 * | 2/2019 | Forwerck ............. | G01D 11/245 |
| 10,670,484 B2 * | 6/2020 | Pusheck .................. | F16J 15/10 |
| 10,883,863 B2 * | 1/2021 | Pusheck ................ | G01D 11/30 |
| 2004/0080317 A1 * | 4/2004 | Collins ................ | G01D 11/245 324/262 |
| 2006/0181859 A1 * | 8/2006 | Thorum ............... | H05K 5/0013 361/719 |
| 2013/0298688 A1 * | 11/2013 | Wade ........................ | G01L 1/26 73/766 |
| 2014/0137656 A1 * | 5/2014 | Henzler ................ | G01D 11/30 73/756 |
| 2015/0135487 A1 * | 5/2015 | Steltz .................... | F16B 5/0614 24/593.1 |
| 2015/0258953 A1 * | 9/2015 | Murray, Jr. .......... | G01D 11/245 73/493 |
| 2016/0061682 A1 * | 3/2016 | Ramsay ............... | G01L 19/147 73/706 |
| 2018/0128297 A1 * | 5/2018 | Meyers ................. | F16B 21/075 |
| 2018/0246001 A1 * | 8/2018 | Kim .................... | G01L 19/0038 |
| 2019/0086245 A1 * | 3/2019 | Kim ..................... | G01D 11/245 |
| 2019/0120666 A1 * | 4/2019 | Pusheck ............... | G01D 11/245 |

\* cited by examiner

*Primary Examiner* — Jamel E Williams
(74) *Attorney, Agent, or Firm* — Dickinson Wright PLLC

(57) ABSTRACT

A mountable circuit assembly is provided. The mountable circuit assembly may be a remote sensor assembly for mounting on sheet metal of a vehicle assembly. The assembly may include a sensor circuit, a housing and a mounting portion. The housing may include a cavity for receiving the sensor circuit. The housing may include first and second locking features. The first locking feature may be on an opposite side of a lock opening from the second locking feature. The mounting portion may be configured to lock into the sheet metal opening in the sheet metal. The mounting portion may have a post such that a plurality of locking features engage the mounting portion. Each locking feature may engage the post at a different position along the longitudinal axis of the post to fasten the housing to the mounting portion.

19 Claims, 12 Drawing Sheets

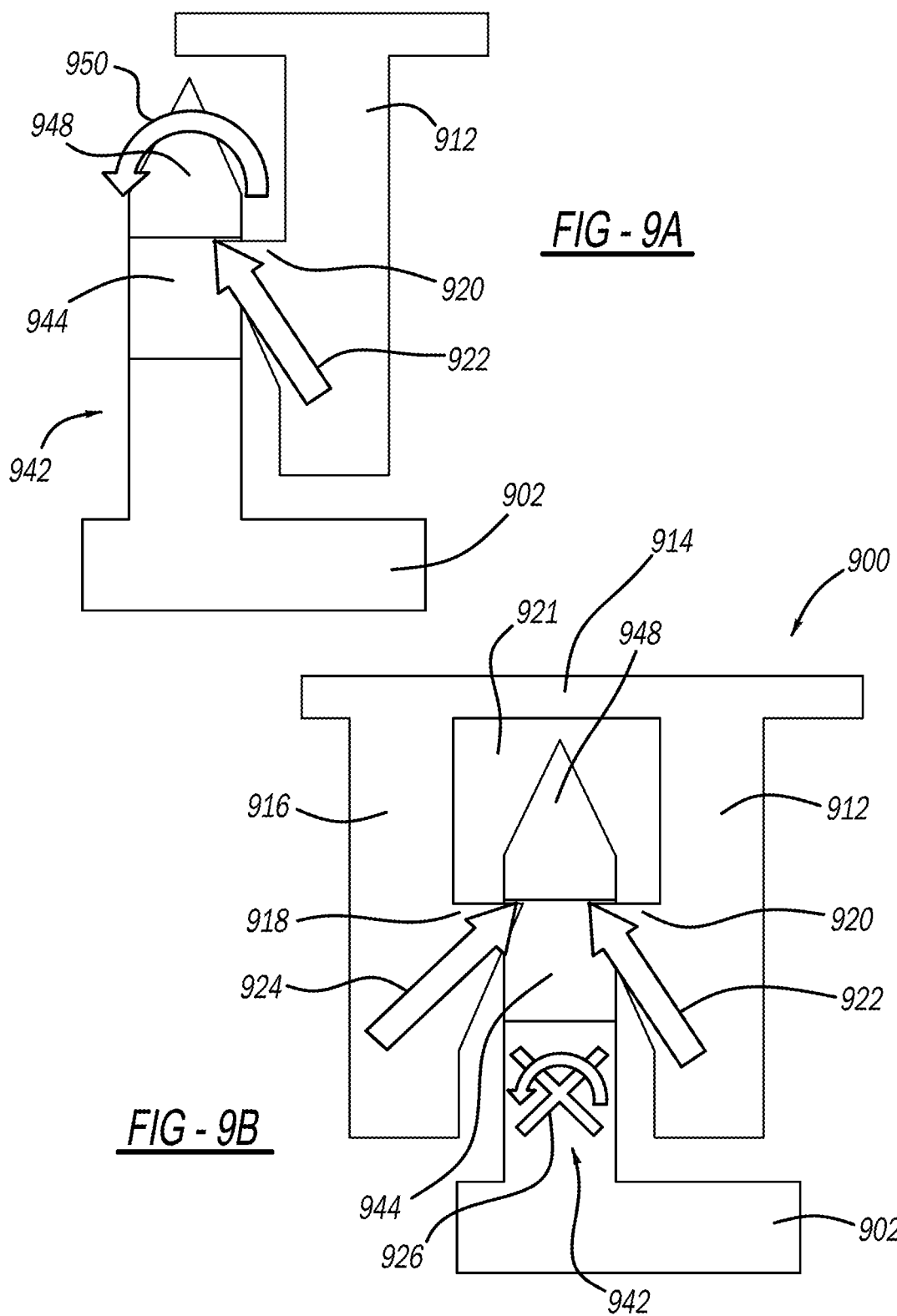

BI-DIRECTIONAL SNAP FIT ELECTRONIC UNIT

BACKGROUND

1. Field of the Invention

The present application generally relates to a mountable circuit assembly.

2. Description of Related Art

Mountable circuit assemblies may include a housing for protecting a circuit within the unit. One example of a mountable circuit assembly includes remote sensing units for mounting on sheet metal assemblies within vehicles. The remote sensing units may mount directly to the sheet metal assembly or to mounting portions which then attach to the sheet metal.

SUMMARY

A mountable circuit assembly is provided. The mountable circuit assembly may be a remote sensor assembly for mounting on sheet metal of a vehicle assembly. The assembly may include a sensor circuit, a housing and a mounting portion. The housing may include a cavity for receiving the sensor circuit. The housing may include first and second locking features. The first locking feature may be on an opposite side of a lock opening from the second locking feature. The mounting portion may be configured to lock into the sheet metal opening in the sheet metal. The mounting portion may have a post such that the first locking feature and the second locking feature engage the mounting portion inside the lock opening to fasten the housing to the mounting portion. The first and second locking features may be aligned to reduce deflection of the post during insertion.

Further objects, features, and advantages of this application will become readily apparent to persons skilled in the art after a review of the following description, with reference to the drawings and claims that are appended to and form a part of this specification.

BRIEF DESCRIPTION OF THE DRAWINGS

FIG. 9A is an illustration of the torque applied to the post if only one locking feature is engaged during a removal attempt.

FIG. 9B is an illustration of the forces applied to the post when both locking features are engaging the post during a removal attempt.

DETAILED DESCRIPTION

The integrity of the mechanical connection between a mountable circuit assembly, such as a remote sensing unit, and the vehicle can be important to the functioning of the unit. The remote sensing unit may include various sensing electronics, for example pressure sensors, accelerometers, gyroscopes, temperature sensors or other known sensing electronics. For some units, such as accelerometers and gyroscopes maintaining the orientation and position of the unit relative to the vehicle can be necessary to provide proper readings. Accordingly, the design of the mechanisms that secure the mountable circuit assemblies to the vehicle may be designed to minimize the deflection of posts and/or other features with locking mechanisms so as to preserve structural integrity. Further, the design may be used to enable various strategies to distribute the force used to secure the housing of the assembly to the vehicle. In some implementations, this may allow distributing the surface area that engages the housing to the vehicle. Multiple locking mechanisms may interact at different locations and/or orientations to improve engagement while reducing damage to the integrity of the structure when the locking mechanisms are forced into position. In some examples, this could be by minimizing deflection of a post. In some examples, this could be by distributing the deflection to minimize overall deflection between locking mechanisms and a post.

Figure 1:
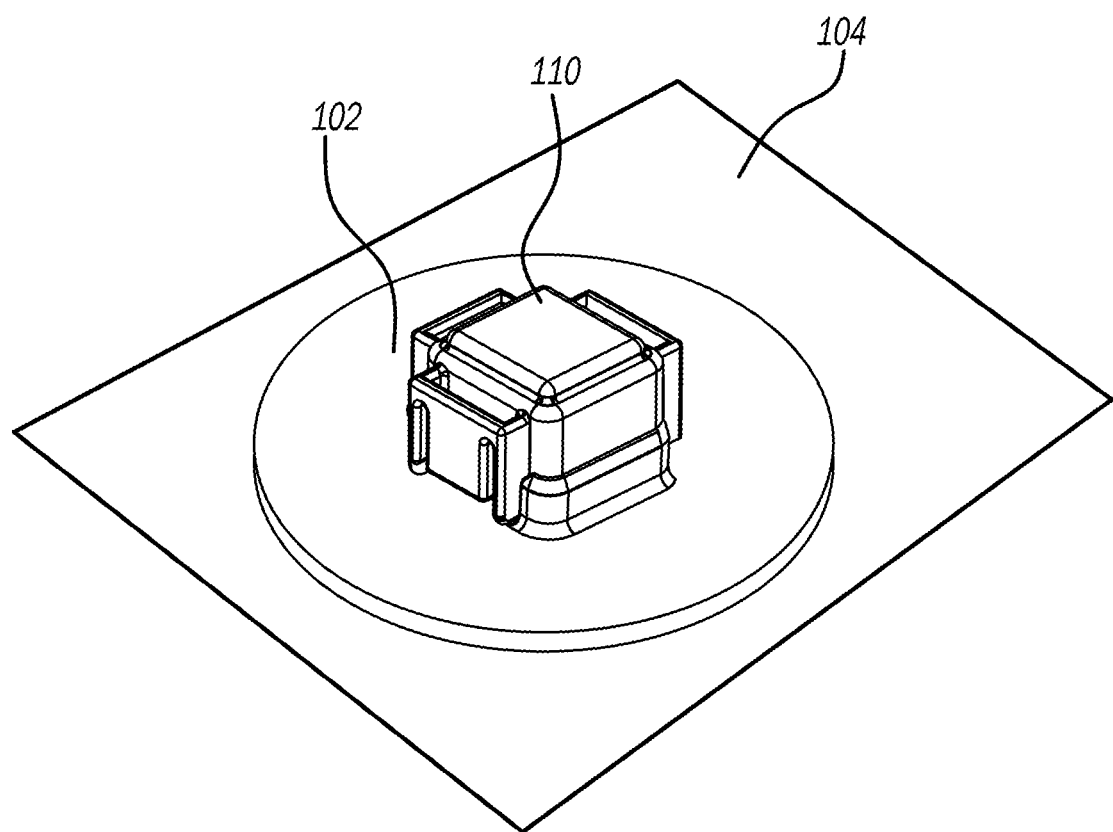
FIG. 1 is a perspective view of a housing and a mounting portion mounted to a sheet metal component.

FIG. 1 is a perspective view of a housing and a mounting portion mounted to a body panel component. While the implementation shown in FIG. 1. Illustrates a twist lock arrangement, other arrangements contemplated by this disclosure such as snap lock arrangements or even where the housing locks directly to a locking portion on the opposite side of the body panel component. The housing 110 (e.g. an electronics housing, such as a remote sensor housing) is fixed to the mounting portion 102 for example, by snap-fit details. The mounting portion 102 is then attached to the body panel for example, by engaging a locking portion through an opening in the body panel 104. The locking portion may be on the opposite side of the body panel from the mounting portion such that as the mounting portion engages the locking portion, both the locking portion and mounting portion are fixed relative to the body panel thereby also affixing the position and orientation of the housing 110 relative to the body panel 104.

Figure 2:
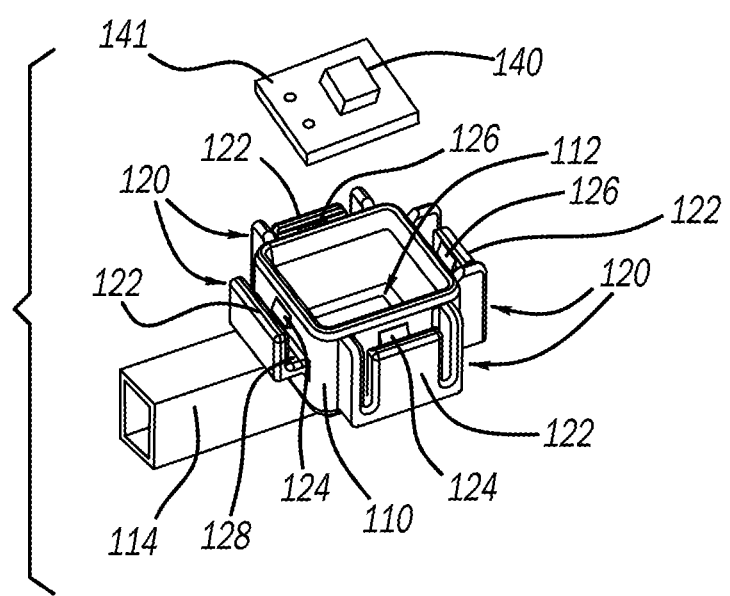
FIG. 2 is an exploded view of an electronics housing, mounting portion, and locking portion.

FIG. 2 is an exploded view of an electronics housing, mounting portion, and locking portion. The housing 110 may include a cavity 112 for receiving electronics, for example sensor electronics. As such, the substrate 141 and chip 140 (e.g. sensor chip) may be received into the cavity 112, then a gasket or sealant may be placed into the cavity over the chip 140 and the substrate 141 to seal and protect the substrate 141 and chip 140. An optional connector 114 may allow other vehicle electronics to communicate with the substrate 141 and/or chip 140 sealed in the cavity 112. An optional gasket (not shown) may be sealed against the mounting portion 102 when the housing 110 is locked onto the mounting portion 102. In one example, a locking portion may engage the mounting portion 102, fixing the mounting portion 102 to a body panel assembly. The mounting portion 102 may have posts that are locked into locking mechanisms 120. The locking mechanisms 120 may each include a first locking feature 124 extending from the wall (shown as 212 in FIG. 4) of the housing 110 and second locking feature 126 extending from a cross-member 122 of the locking mechanism 120. As such, the posts from the mounting portion 102 may be locked into place when the first and second locking features engage the posts. Some locking mechanisms may have support members including side support members (shown as 224 in FIG. 4) and end support members (shown as 214 in FIG. 4) extending from the wall to the cross-member while other locking mechanisms may have only a cross-member 122, for example, the front locking mechanism 120.

Figure 3:
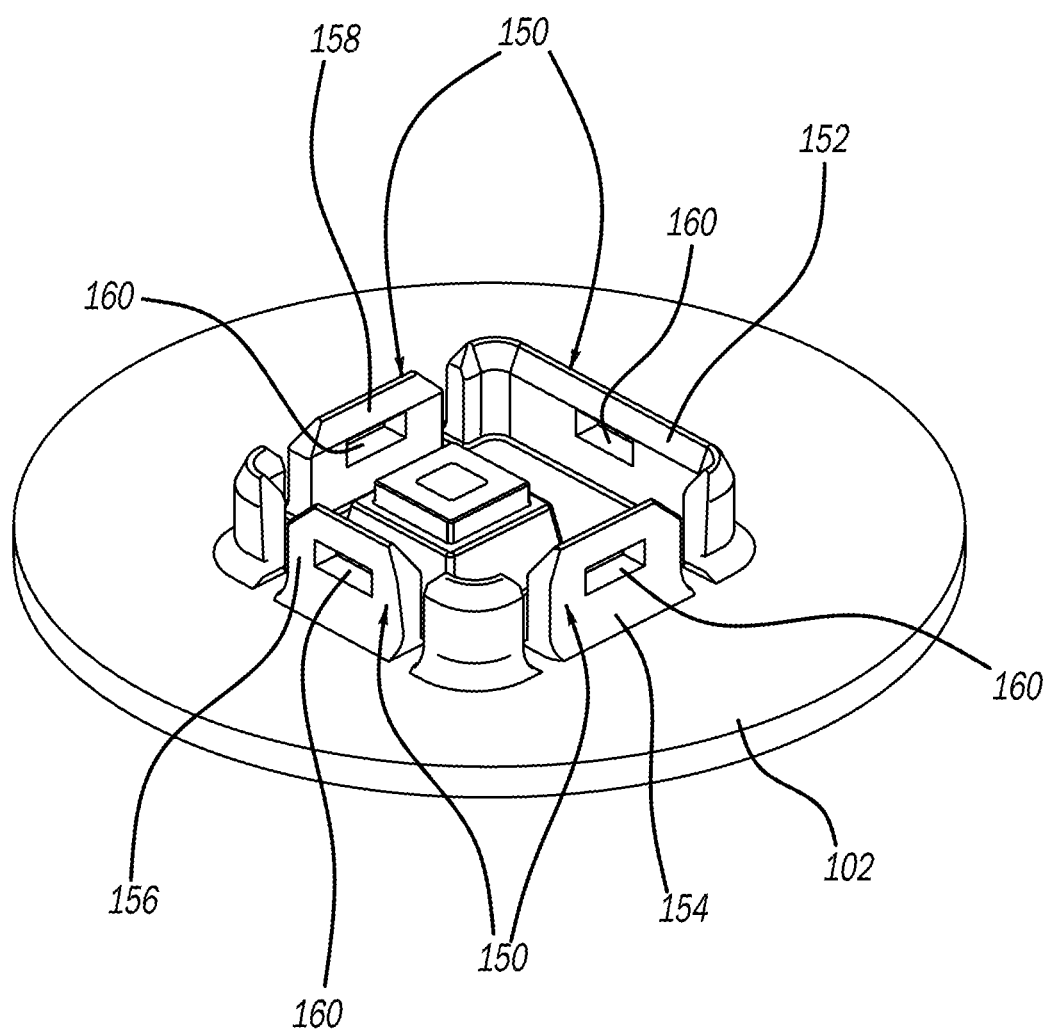
FIG. 3 is a perspective view of the mounting portion.

FIG. 3 is a perspective view of the mounting portion 102. The mounting portion 102 may include posts 150 that may be engaged by the locking mechanisms 120 of the housing 110. The posts 150 may have different sizes and shapes such that only one orientation of the housing 110 relative to the mounting portion 102 will allow the housing 110 to be locked onto the mounting portion 102 thereby controlling the position and orientation of the housing 110 relative to the body panel assembly. For example, post 152 may be the front post and interface with a front locking mechanism of the housing 110. The elongated nature of the post 152 would not be received by a locking mechanism with cross-members. Additionally, post 156 may be not as long as other posts and therefore may fit into a smaller locking mechanism to control the orientation of the housing. Additional posts 154 and 158 may have the same or different shapes as needed to affix the housing 110 the mounting portion 102. The posts 150 may include post openings 160. The post openings 160 may be engaged by the first and second locking features 124,126 within the locking mechanisms 120.

Figure 4:
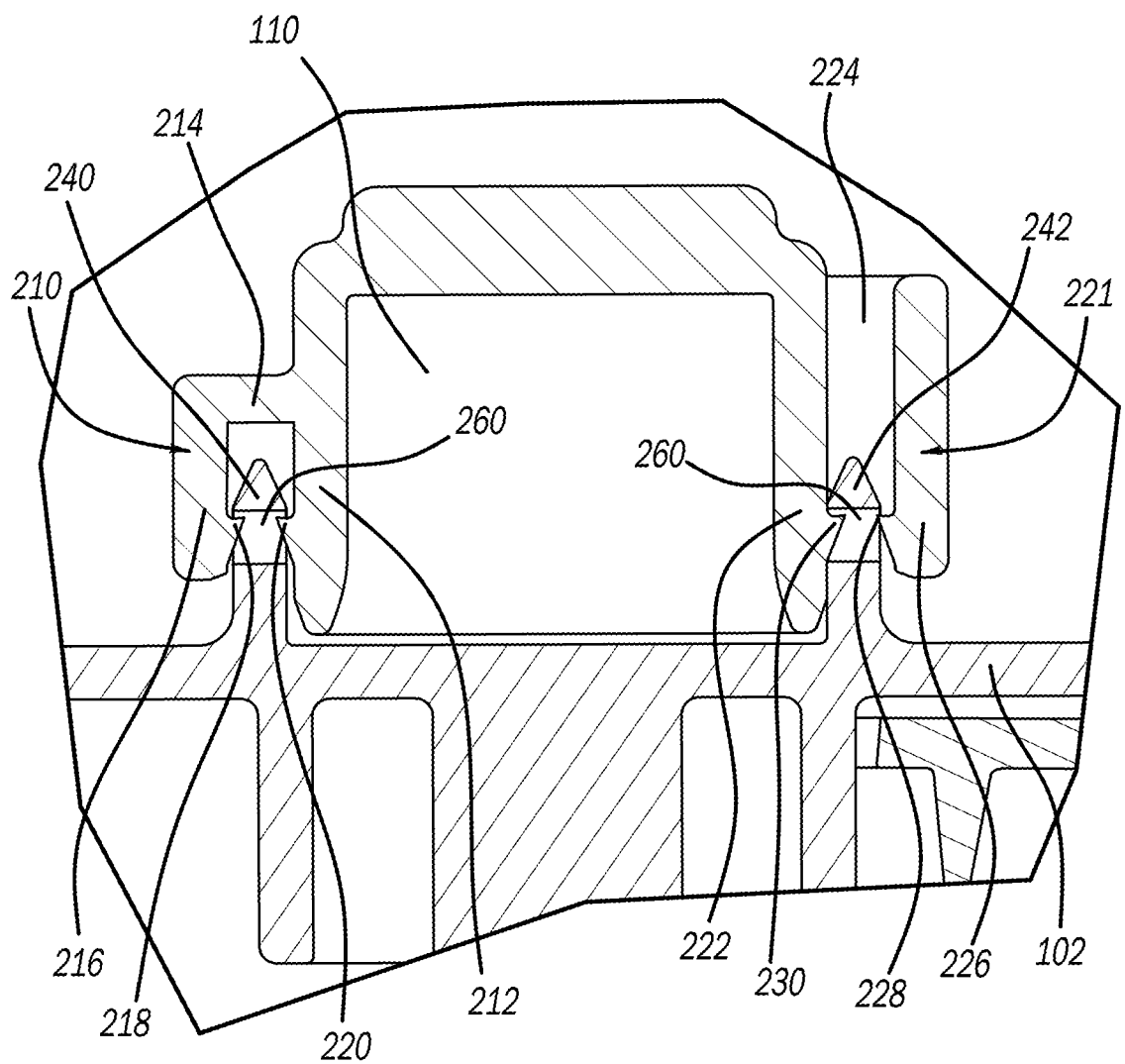
FIG. 4 is a cross-sectional view showing the engagement of the locking mechanisms with the posts.

FIG. 4 is a cross-sectional view, with the substrate and sensor removed for clarity, showing the engagement of the locking mechanisms with the posts. The housing 110 is shown with a first locking mechanism 210 and a second locking mechanism 221. The first locking mechanism 210 includes a first locking feature 220 extending from a housing wall 212 and a second locking feature 218 extending from a cross-member 216. An end support member 214 may connect the cross-member 216 with the housing wall 212. The first locking feature 220 and the second locking feature 218 may engage an opening 260 in the post 240 of the mounting portion 102.

The second locking mechanism 221 may be located on an opposite side of the housing 110 and may include a first locking feature 230 extending from the wall 222 and a second locking feature 228 extending from cross-member 226. Cross-member 226 may be supported by a side support member 224 connecting the cross-member 226 to the housing wall 222. The first and second locking features 230, 228 may engage a post opening 260 in the post 242 of the mounting portion 102 thereby affixing the location of the remote sensor housing 110 relative the mounting portion 102.

Figure 5:
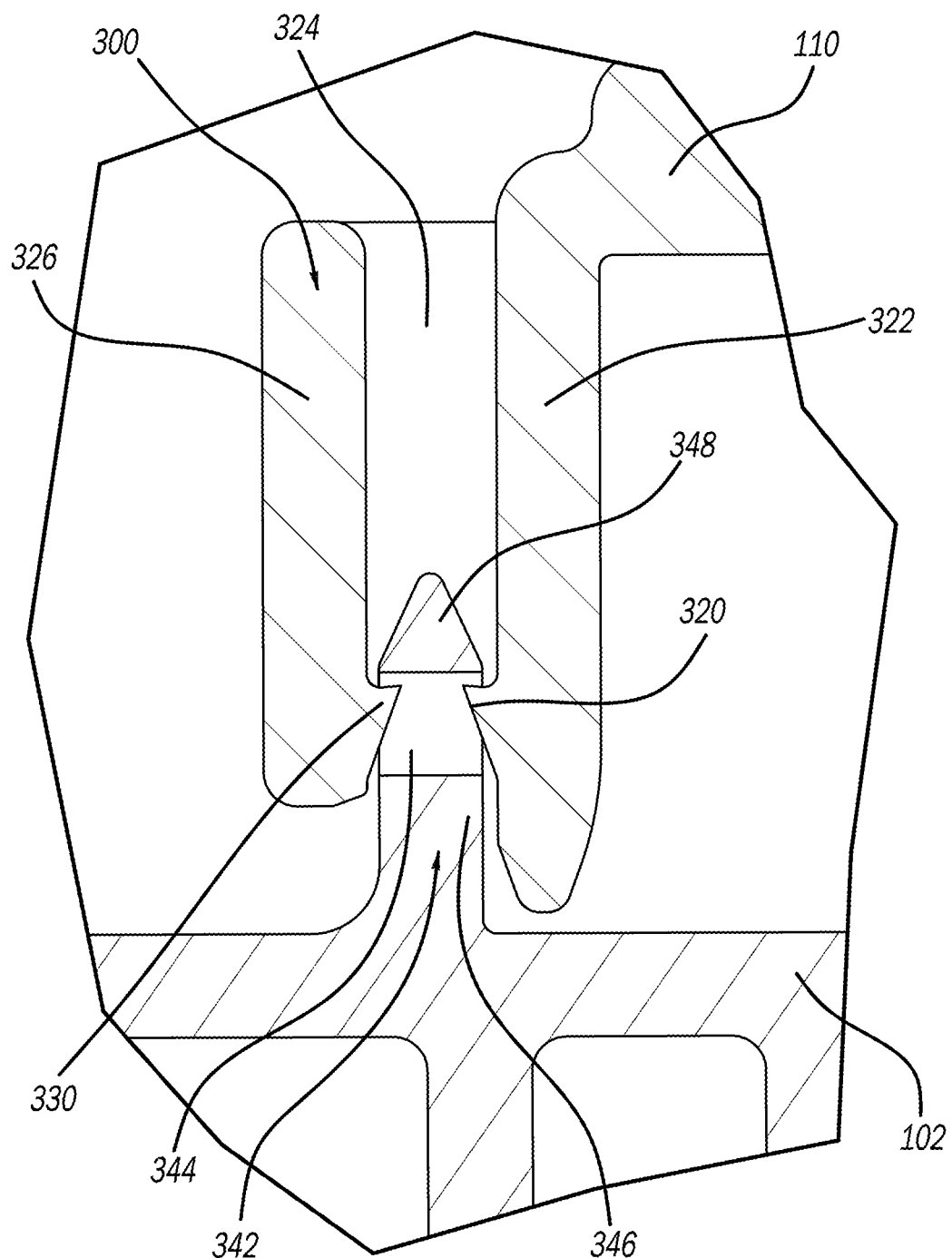
FIG. 5 is a more detailed view of the first of the cross-section of a locking mechanism.

FIG. 5 is a more detailed view of the cross-section of the first locking mechanism 300. The post 342 of the mounting portion 102 is inserted into the lock opening 324 of the locking mechanism 300. The tip portion 348 of the post 342 may be chamfered or triangular in shape. As the post 342 is inserted into the lock opening 324, the tip portion 348 of the post 342 pushes against the locking features 330 and 320. The locking features 320 and 330 may include ramped surfaces that interact with ramped surfaces on the tip portion 348 that assist in deflecting the locking features 320 and 330 during insertion. This may cause a force to be applied to the cross-member 326 and 322 wall of the housing 110. The post 342 includes a post opening 344 that allows the locking features 330 and 320 to extend into and engage the post 342, thereby locking the remote sensor housing 110 to the mounting portion 102. By having a symmetric locking features 330, 320 as well as centering post 342 within the lock opening 324, an equal force may be exerted between the post 342 and each locking feature 320, 330. By exerting equal force between the post 342 and the first and second locking feature 320, 330, the stress on the lower portion 346 of the post 342 is minimized and maximum structural integrity of the post is maintained. The design can provide that a shifting of the post 342 toward or away from one of the locking features 320, 330 (e.g. horizontally in the FIG. 5) maintains that the combined overlap of the first and second locking features 320, 330 with the post 342 remains the same.

Figure 6:
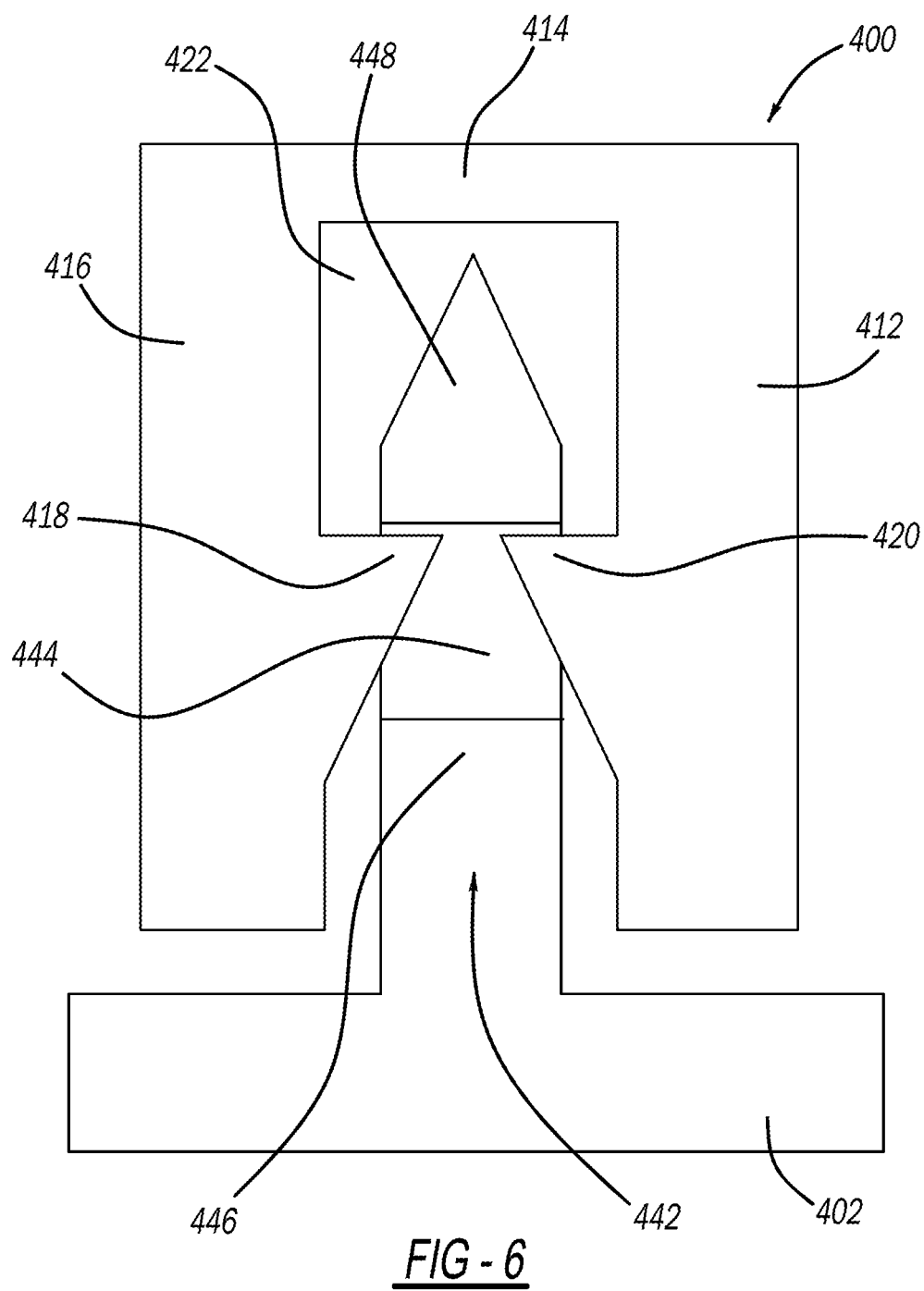
FIG. 6 is an illustration of the interaction between a locking mechanism and a post.

FIG. 6 is an illustration of the interaction between a locking mechanism 400 and a post 442 of a mounting portion 402. The locking mechanism 400 may be partially formed by a wall 412 of the sensor housing unit. A locking feature 420 may extend from the wall 412 into a lock opening 422 of the locking mechanism 400. The locking mechanism 400 may also include a cross-member 416 that may be attached to the wall 412 by an end support member 414. The cross-member 416 may include a locking feature 418 that extends into the lock opening 422 opposite the locking feature 420. The locking feature 418 may have the same shape and may be symmetric to locking feature 420. The locking feature 418 may be aligned vertically (e.g. along the direction of post insertion) with locking feature 420. Further, each of locking mechanisms 418 and 420 may extend the same distance into the lock opening 422 such that an equal force will be applied to the tip 448 of the post 442 as the post 442 is inserted past the locking features 418, 420 into the lock opening 422. As such, the equal force applied by locking feature 418 and locking feature 420 to the post 442. This can reduce any torque or deformation on the lower portion 446 of the post 442 as the tip 448 is inserted into the lock opening 422.

Figure 7:
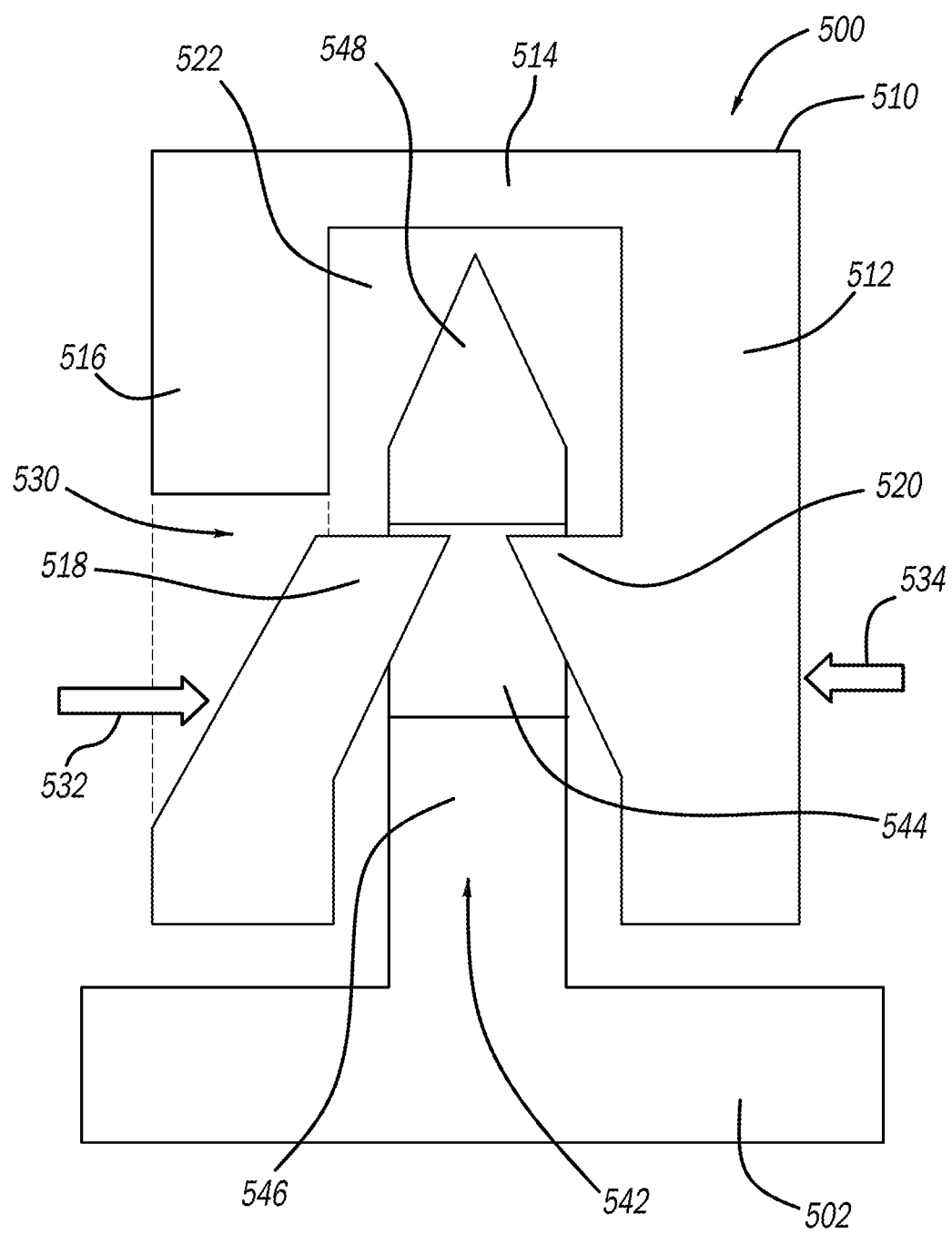
FIG. 7 is an illustration of the interaction between another locking mechanism and a post.

FIG. 7 is an illustration of the interaction between locking mechanism 500 and post 542 of mounting portion 502. The locking mechanism 500 may be partially formed by a wall 512 of the sensor housing unit 510. A locking feature 520 may extend into a lock opening 522 of the locking mechanism 500. The locking mechanism 500 may also include a cross-member 516 that may be attached to the wall 512 by an end support member 514. The cross-member 516 may include a locking feature 518 that extends into the lock opening 522 opposite the locking feature 520. The locking feature 518 may be aligned vertically (e.g. along the direction of post insertion) with locking feature 520. The cross-member 516 may include an opening 530 such that the locking mechanism 518 may be a partially independent extension from the cross-member 516 allowing greater flexibility as the post 542 is inserted into the lock opening 522. The greater flexibility of the locking mechanism 500 may mean that the same amount of force may be applied to the post 542 while the locking mechanism 518 may extend further into lock opening 522 than locking mechanism 520. As such, the greater deformation of the motion of the locking mechanism 518 may be illustrated by the longer arrow 532 as compared to the arrow 534 illustrating the deformation of the locking mechanism 520 attached to the wall 512.

Figure 8A:
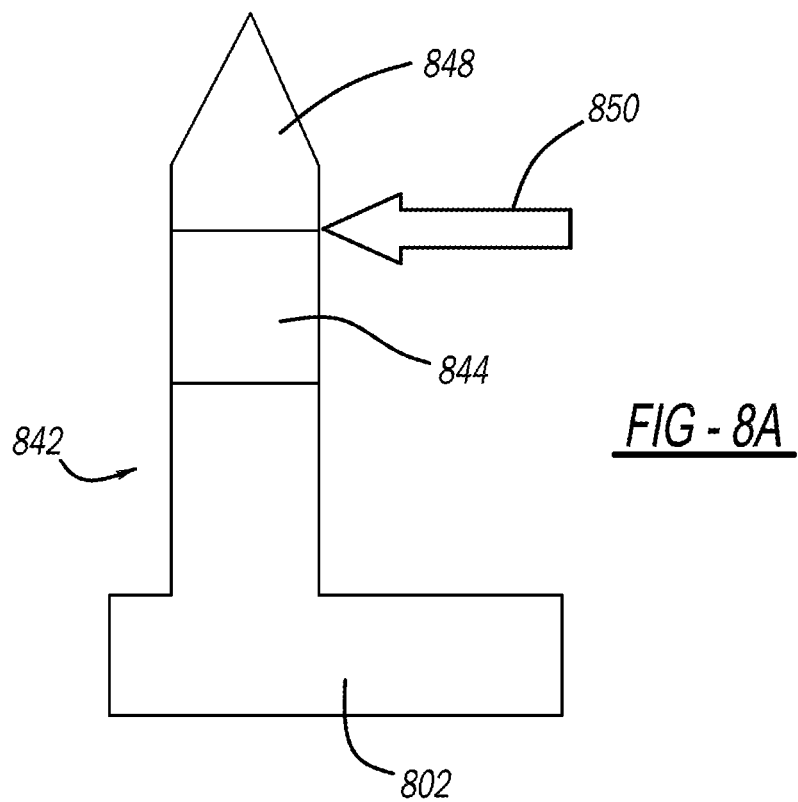
FIG. 8A is an illustration of the force applied by one of the locking features as the post is inserted into a locking mechanism.

FIG. 8A illustrates the effect of the force applied by one of the locking features as the post is inserted into a locking mechanism. The locking feature may apply force to the tip 848 of the post 842 of the mounting portion 802. The force 850 is applied until the post 842 is inserted far enough such that the locking feature snaps into the opening 844 in the post 842. In this implementation, the force is absorbed primarily by the post 842 which absorbs most of the force causing deflection of the post 812 and possible degradation. Yet, the post has significantly less support than, for example, a locking feature that is formed as part of the wall.

Figure 8B:
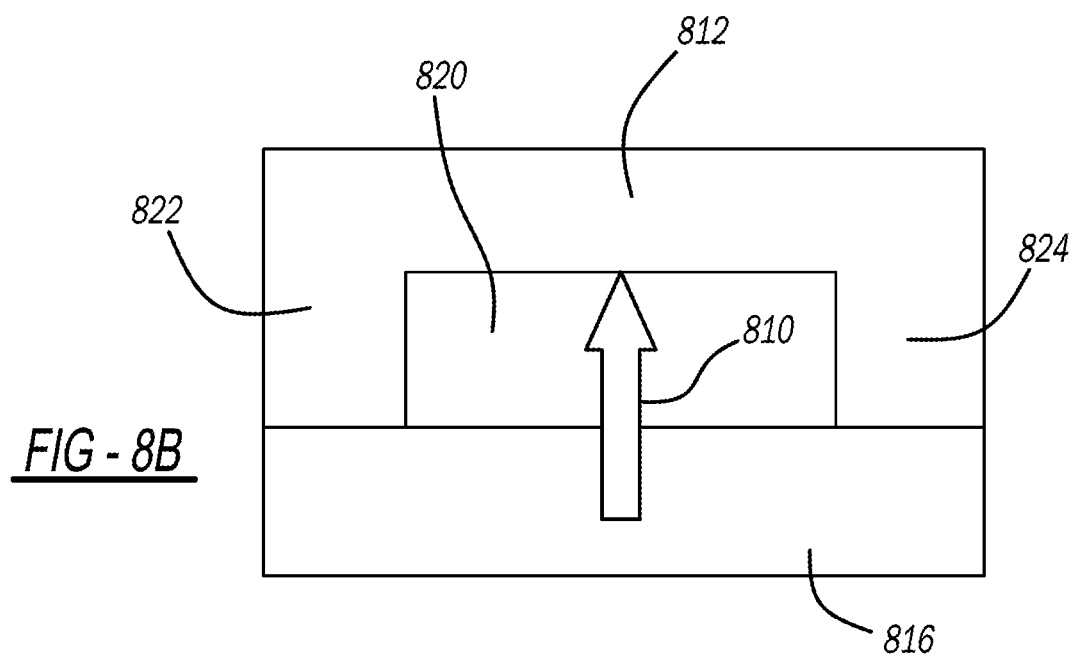
FIG. 8B is an illustration of the force that the post applies to a locking mechanism.

FIG. 8B illustrates the force that the post applies to a locking mechanism. The force 810 is created by the post 842 being inserted into the lock opening 820 of the locking mechanism. The housing wall 816 may be thicker than the rest of the locking mechanism and therefore may provide more support and deflect less than other portions of the locking mechanism. For example, the cross-member 812 may be thinner than the wall 816 and therefore may flex more than the wall 816 even though it is supported by support members 822 and 824. Yet, support members 822, 824 make the cross-member 812 less susceptible to degradation than the post 842.

FIG. 9A illustrates the torque applied to the post if only one locking feature is engaged during a removal attempt. If the locking feature 920 of the wall 912 is the only locking feature engaged, than the post 942 of the mounting portion 902 is pulled against the locking feature 920 in an attempt to remove the post 942 from the locking mechanism 920. The force 922 caused by the locking feature 920 against a peripheral wall defining a perimeter of the opening 944 in the post 942 generates a torque 950 against the tip 948 of the post 942 which may damage or compromise the structural integrity of the post 942 as it is pulled against in an attempt to be removed.

FIG. 9B illustrates forces applied to the post when both locking features are engaging the post during a removal attempt. The locking mechanism 900 may be partially formed by a wall 912 of the sensor housing unit. A locking feature 920 may extend into a lock opening 921 of the locking mechanism 900. The locking mechanism 900 may also include a cross-member 916 that may be attached to the wall 912 by an end support member 914. The cross-member 916 may include a locking feature 918 that extends into the lock opening 922 opposite the locking feature 920.

When the post 942 is pulled during removal, the first locking feature 920 causes a first force 922 to be applied against the tip 948 of the post 942 and at the same time, the second locking feature 918 causes a second force 924 to be applied to the tip 948 of the post 942. The force 922 and the force 924 both being applied to the tip 948 of the post 942 have a cancelling affect in the plane perpendicular to the post direction thereby causing a net cancellation of any torque as illustrated by reference number 926.

Figure 9C:
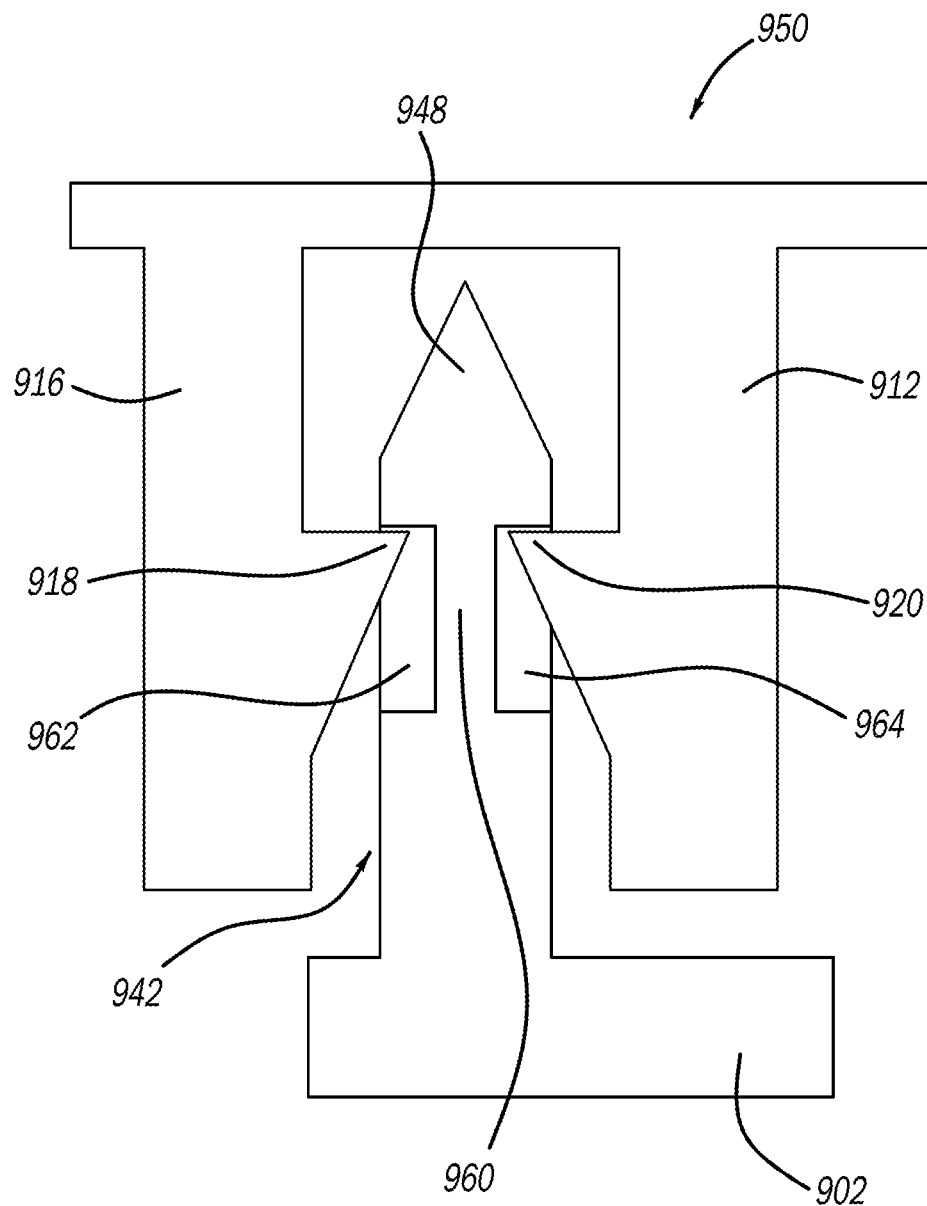
FIG. 9C is an illustration of the interaction of a locking mechanism with a modified post.

FIG. 9C illustrates the interaction of a locking mechanism 950 with a modified post. The post 942 has a first recess 962 and a second recess 964. A support portion 960 runs between the first recess 962 and the second recess 964. The first recess 962 aligns with locking feature 918 and the second recess 964 aligns with the locking feature 920.

Figure 10:
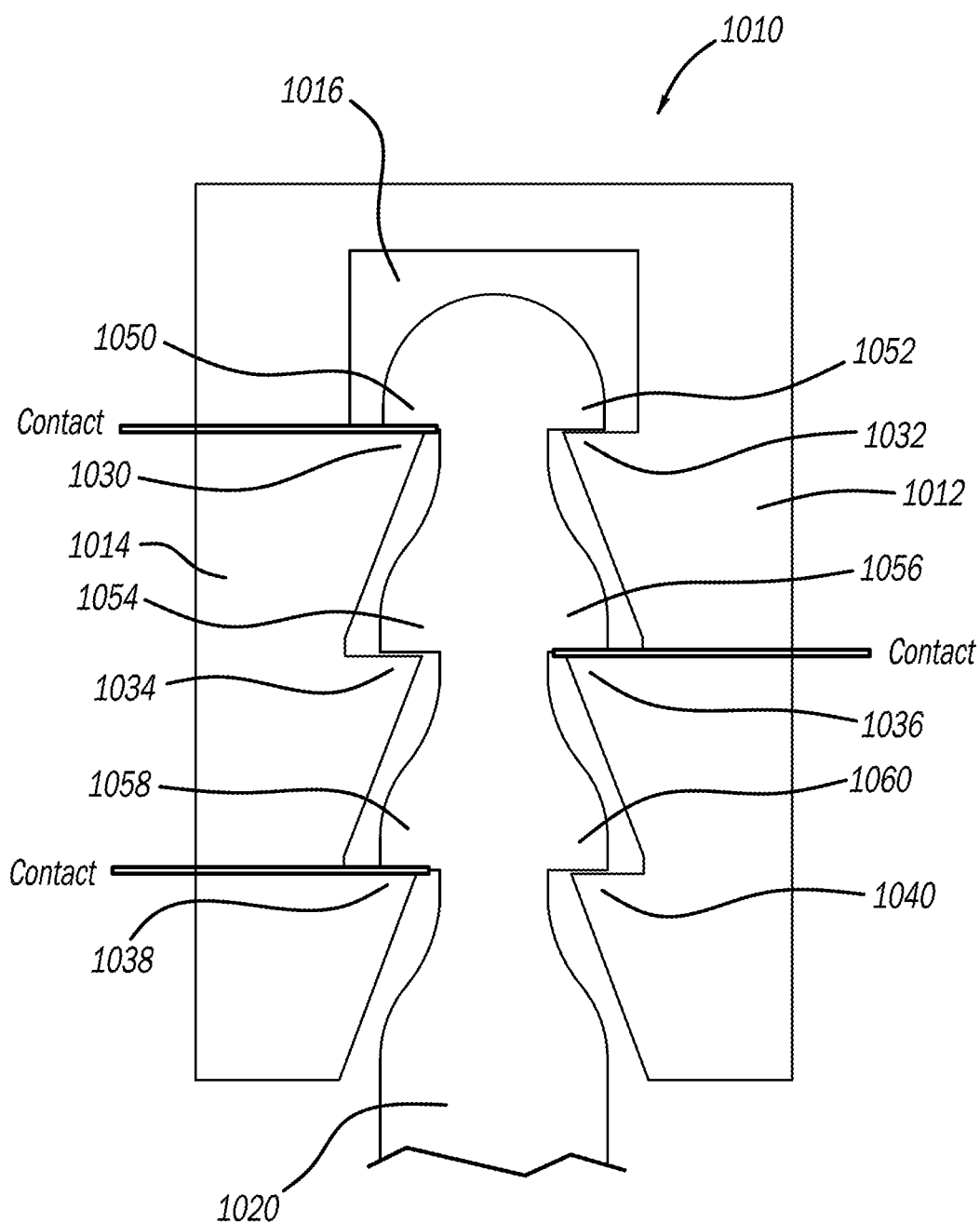
FIG. 10 is an illustration of a multi-featured post having alternating contact points to minimize the displacement of all components.

FIG. 10 is an illustration of a multi-featured post having alternating contact points to minimize the displacement of all components. The locking mechanism 1010 includes a first wall 1012 and a second wall 1014 (which may be a cross-member as discussed with regard to the previous figures). The post 1020 may be inserted into a lock opening 1016 of the locking mechanism. The lock opening 1016 may be formed by the first wall 1012 and the second wall 1014. The first wall 1012 may include multiple locking features, for example, locking feature 1032, locking feature 1036, and locking feature 1040. The post 1020 may have corresponding engagement features 1052, engagement feature 1056, and engagement feature 1060. The second wall 1014 may include multiple locking features including locking feature 1030, locking feature 1034, and locking feature 1038. The post 1020 may have corresponding engagement features including engagement feature 1050, engagement feature 1054, and engagement feature 1058.

Engagement features on a first side of the post 1020 (e.g., 1052, 1056, 1060) may be offset from engagement features on a second side of the post 1020 (e.g., 1050, 1054, 1058). Therefore, the locking features of the first wall 1012 and the corresponding engagement features on the post 1020 may engage in an alternating fashion. For example, locking feature 1032 and locking feature 1040 may not engage engaging feature 1052 and engaging feature 1060, respectively, while locking feature 1036 may engage engaging feature 1056. Further, the locking features of the second wall 1014 and the corresponding engagement features on the post 1020 may also engage in an alternating fashion. For example, locking feature 1030 and locking feature 1038 may engage engaging feature 1050 and engaging feature 1058, respectively, while locking feature 1034 may not engage engaging feature 1054.

Additionally, the engaging features on one side of the post may be aligned to correspond with engaging features on an opposite side of the post, which may alternately engage the locking features on opposing walls. For example, locking feature 1030 will engage engaging feature 1050 while locking feature 1032 will not engage engaging feature 1052. For example, locking feature 1034 will not engage engaging feature 1054 while locking feature 1036 will engage engaging feature 1056, additionally, locking feature 1038 will engage engaging feature 1058 while locking feature 1040 will not engage engaging feature 1060. In this design, the alternating locking features may be slightly offset relative to the corresponding engagement features. This could be due to a change in the periodicity of the locking features, engaging features of both. As such, each locking feature may engage the post at a different position along the longitudinal axis (e.g. along the direction of insertion) of the post to fasten the housing to the mounting portion.

Also, the locking features may be classified into one or more groups. For example, post may include a first group of engaging features that align with the first group of locking features and a second group of engaging features that align with the second group of locking features. For example, the first group of locking features may include locking features 1030, 1036, 1038 and the first group of engaging features may include engaging features 1050, 1056, 1058, while the second group of locking features may include locking features 1032, 1034, 1040 and the second group of engaging features may include engaging features 1052, 1054, and 1060. Further, the interference of the post and the first group of locking features may deflect the post in a first direction and interference of the post and the second group of locking features deflect the post in a second direction causing the post to alternate between deflecting in the first and second directions as the post is inserted into the lock opening. In some implementations, the first group of locking features may be configured to apply an equal amount of pressure to the post as the second group of locking features. Although, each group may apply a different amount of pressure at different times based an offset between the groups. The first group of locking features may be aligned to be disengaged from the post when the second group of locking features are engaged with the post and, similarly, the second group of locking features may be aligned to be disengaged from the post when the first group of locking features are engaged with the post. Accordingly, the deflection of the post and the two snap lock features is minimized.

Figure 11:
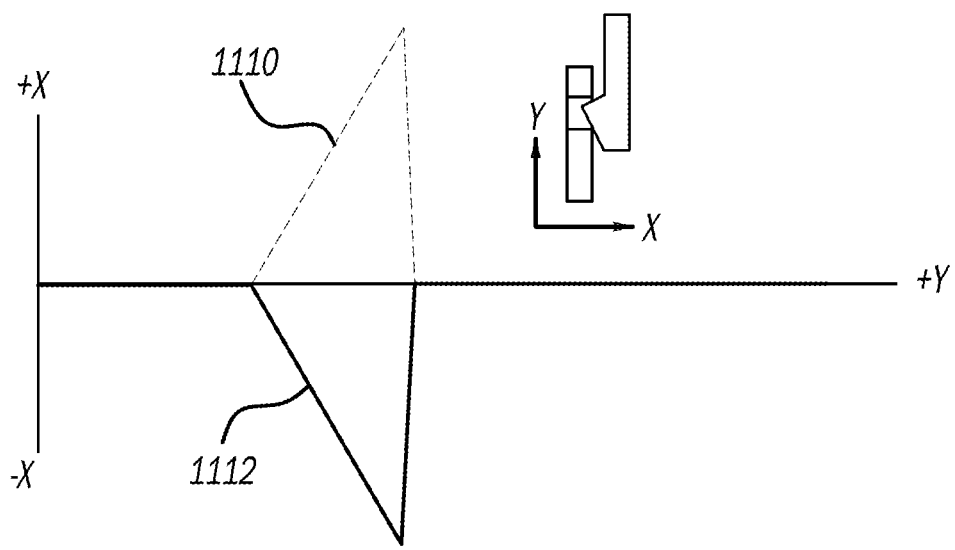
FIG. 11 is a graph illustrating the deflection if a single locking feature is utilized to engage the post.

FIG. 11 is a graph illustrating the deflection if a single locking feature is utilized to engage the post. The displacement of the post is illustrated as line 1110 and the displacement of the locking feature is illustrated as line 1112. As can be seen in FIG. 11, the displacement of the locking feature may be opposite to the displacement in the post. The displacement may be equal in distance or the post may be displaced a different distance than the locking feature.

Figure 12:
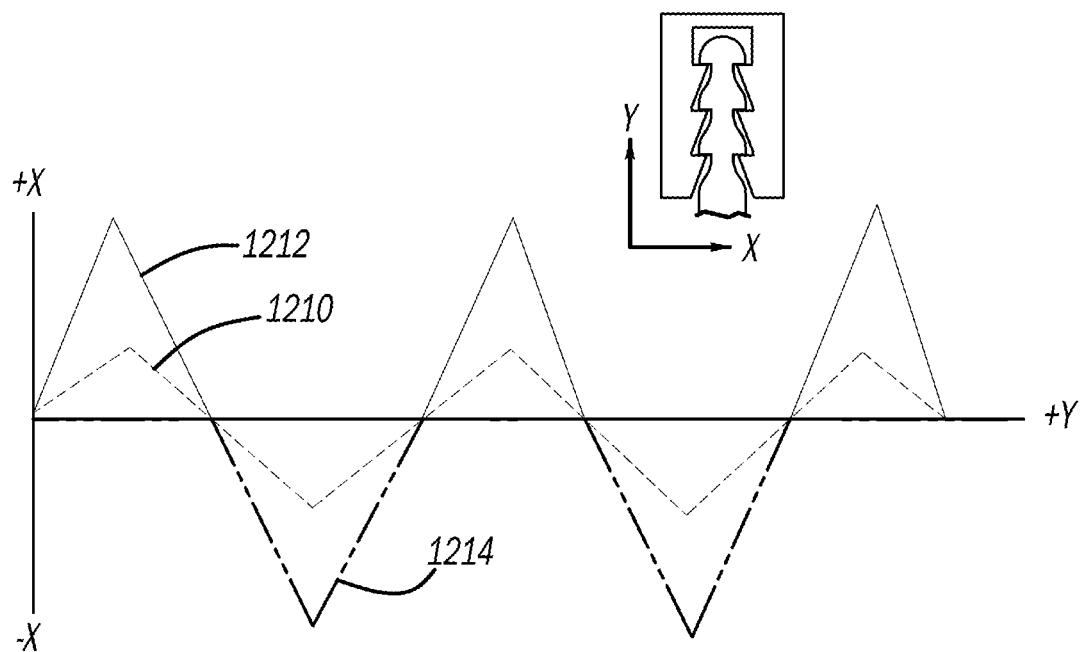
FIG. 12 is a graph illustrating the displacement of each wall and the post for the implementation illustrated in FIG. 10.

FIG. 12 illustrates the displacement of each wall and the post in the implementation illustrated in FIG. 10. The displacement of the post is illustrated by line 1210, the displacement of the first wall is illustrated by a line 1212 and the displacement of the second wall is illustrated by line 1214. In this instance, the displacement is reduced as the displacement is minimized among each of the three components such that the structural integrity is maintained and degradation is minimized through minimizing the displacement of each component.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

The invention claimed is:

1. A mountable sensor assembly for mounting on a body panel of a vehicle assembly, the body panel having an opening for mounting the mountable sensor assembly, the mountable sensor assembly comprising:
a sensor circuit; and
a housing comprising a cavity that receives the sensor circuit, the housing comprising a plurality of locking features; and
a mounting portion configured to lock into the body panel opening, the mounting portion having a post, individual of the plurality of locking features engaging the post at a different position along the longitudinal axis of the post to fasten the housing to the mounting portion, wherein a first locking feature of the plurality of locking features engages the post from a first direction on a first side of the post and a second feature of the plurality of locking features engages the post from a different direction on a second opposing side of the post.

2. The mountable sensor assembly according to claim 1, wherein the post includes a first lock opening that aligns with the first locking feature and a second lock opening that aligns with the second locking feature.

3. The mountable sensor assembly according to claim 2, wherein an interference of the post and the first locking feature deflects the post in the first direction and an interference of the post and the second locking feature deflects the post in the second direction causing the post to alternate between deflecting in the first and the second directions as the post is inserted into the housing.

4. The mountable sensor assembly according to claim 3, wherein the first locking feature extends into at least one of the lock openings from a wall of the housing.

5. The mountable sensor assembly according to claim 4, wherein the second locking feature extends into at least one of the lock openings from a cross-member.

6. The mountable sensor assembly according to claim 5, wherein the cross-member is located across at least one of the lock openings from the wall of the housing.

7. The mountable sensor assembly according to claim 6, wherein the cross-member is attached to the wall by a first side support member at one end of one of the lock openings and by a second side support member at an opposite end of one of the lock openings.

8. The mountable sensor assembly according to claim 1, wherein the first of the locking feature is configured to apply an equal amount of pressure to the post as the second locking feature.

9. The mountable sensor assembly according to claim 1, wherein a third locking feature of the plurality of locking features is comprised of at least one of the first and second locking features, and a fourth locking feature of the plurality of locking features is comprised of at least one of the first and second locking features that is different than the locking features in the third locking feature, the third locking feature is aligned to be disengaged from the post when the fourth locking feature is engaged with the post.

10. The mountable sensor assembly according to claim 9, wherein the fourth locking feature is aligned to be disengaged from the post when the third locking feature is engaged with the post.

11. A sensor housing for engaging a post for mounting the sensor housing to a vehicle assembly, the sensor housing comprising:
a cavity that receives a sensor circuit,
a mounting portion having a post,
a plurality locking features forming a first and a second locking feature;
the second locking feature engaging the post at a different position than the first locking feature along a longitudinal axis of the post, wherein the first locking feature engages the post from a first direction on a first side of the post and the second locking feature engages the post from a second direction different from the first direction on a second side of the post.

12. The sensor housing according to claim 11, wherein post includes a first opening that aligns with the first locking feature and a second opening that aligns with the second locking feature.

13. The sensor housing according to claim 12, wherein interference of the post and the first locking feature deflects the post in the first direction and an interference of the post and the second of locking feature deflect the post in the second direction, causing the post to alternate between deflecting in the first and the second directions as the post is inserted into the housing.

14. The sensor housing according to claim 13, wherein the first locking feature extend into the lock opening from a wall of the housing.

15. The sensor housing according to claim 14, wherein the second locking feature extend into the lock opening from a cross-member.

16. The sensor housing according to claim 15, wherein the cross-member is located across the lock opening from the wall of the housing.

17. The sensor housing according to claim 16, wherein the cross-member is attached to the wall by a first support at one end of the lock opening and by a second support at an opposite end of the lock opening.

18. A mountable sensor assembly for mounting on a body panel of a vehicle assembly, the body panel having a body panel opening for mounting the mountable sensor assembly, the mountable sensor assembly comprising:
   a sensor circuit; and
   a housing comprising a cavity that receives the sensor circuit, the housing comprising a first locking feature and a second locking feature extending into a lock opening; and
   a mounting portion configured to lock into the body panel opening, the mounting portion having a post configured to extend into the lock opening, the second locking feature engaging the post at a different position than the first locking feature along a longitudinal axis of the post, wherein the first locking feature engages the post from a first direction on a first side of the post and the second locking feature engages the post from a second direction different from the first direction and a second opposite side of the post.

19. The mountable sensor assembly according to claim 18, wherein the first locking feature extends from a wall of the housing into the lock opening and the second locking feature extends from a cross-member into the lock opening, the cross-member being attached to the wall by a first support at one end of the lock opening and attached to the wall by a second support at an opposite end of the lock opening.

* * * * *